United States Patent
Fujii et al.

(10) Patent No.: US 6,528,196 B1
(45) Date of Patent: Mar. 4, 2003

(54) FUEL CELL STACK HAVING BENT SECTION FLOW PASSAGE GROOVES

(75) Inventors: Yosuke Fujii, Tochigi-ken (JP); Masaharu Suzuki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/634,098

(22) Filed: Aug. 8, 2000

(30) Foreign Application Priority Data

Aug. 13, 1999 (JP) .......................................... 11-229470

(51) Int. Cl.[7] ................................................ H01M 2/02
(52) U.S. Cl. ........................................ 429/34; 429/38
(58) Field of Search ...................................... 429/34, 38

(56) References Cited

U.S. PATENT DOCUMENTS 5,547,776 A    8/1996   Fletcher et al.
5,686,199 A  * 11/1997  Cavalca et al. ................ 429/30
6,255,011 B1 *  7/2001  Fujii et al. ..................... 429/32
6,420,061 B1 *  7/2002  Fujii et al. ..................... 429/26

* cited by examiner

Primary Examiner—Carol Chaney
Assistant Examiner—Dah Wei D. Yuan
(74) Attorney, Agent, or Firm—Lahive & Cockfield, LLP

(57) ABSTRACT

First gas flow passage grooves which communicate with an oxygen-containing gas inlet, and second gas flow passage grooves into which the first gas flow passage grooves are merged and which communicate with an oxygen-containing gas outlet are provided on a surface of a first separator. First communication passages and second communication passages for enabling the air to flow therethrough are provided at first and second bent sections of the first gas flow passage grooves and the second gas flow passage grooves. Accordingly, when the air flowing in the surface of the separator is bent over, then the flow rate of the air is not partially lowered, and it is possible to reliably remove produced water.

11 Claims, 10 Drawing Sheets

FUEL CELL STACK HAVING BENT SECTION FLOW PASSAGE GROOVES

RELATED APPLICATIONS

This application claims priority to Japanese Patent Application No. 11-229470 filed on Aug. 13, 1999 in Japan. The contents of the aforementioned application are hereby incorporated by reference.

BACKGROUND OF THE INVENTION

1. Field of the Invention

The present invention relates to a fuel cell stack comprising a plurality of fuel cell units each composed of an electrolyte interposed between an anode electrode and a cathode electrode, the plurality of fuel cell units being stacked with separators intervening therebetween.

2. Description of the Related Art

For example, the solid polymer type fuel cell comprises a fuel cell unit including an anode electrode and a cathode electrode disposed opposingly on both sides of an electrolyte composed of a polymer ion exchange membrane (cation exchange membrane) respectively, the fuel cell unit being interposed between separators. Usually, the solid polymer type fuel cell is used as a fuel cell stack comprising a predetermined number of the fuel cell units and a predetermined number of the separators which are stacked with each other.

In such a fuel cell, a fuel gas such as a hydrogen-containing gas, which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas containing oxygen or air is supplied to the cathode electrode. Therefore, the hydrogen ion, the electron, and the oxygen gas are reacted with each other on the cathode electrode, and thus water is produced.

In order to supply the fuel gas and the oxygen-containing gas to the anode electrode and the cathode electrode respectively, a porous layer such as porous carbon paper having conductivity is usually interposed at the catalyst electrode layer (electrode surface) by the aid of the separator. One or a plurality of gas flow passages designed to have a uniform widthwise dimension are provided on the mutually opposing surface of each of the separators.

For example, as shown in FIG. 10, a fuel cell stack disclosed in U.S. Pat. No. 5,547,776 has an opening 2 for oxygen-containing gas and an outlet opening 3 which are formed to penetrate through a plate 1. A plurality of flow passage grooves 5a to 5f, which make communication between the opening 2 and the outlet opening 3, are formed in a meandering manner on a surface 4 of the plate 1.

Since the flow passage grooves 5a to 5f meander in the surface 4, a plurality of bent sections 6 are provided corresponding to the both sides of the plate 1. However, at the bent section 6, the curvature is considerably small for the inner flow passage grooves 5f, 5e, although the outer flow passage groove 5a has a relatively large curvature.

Therefore, the pressure loss differs between the inner side (side of the flow passage groove 5f) and the outer side (side of the flow passage groove 5a) of the bent section 6 and it is difficult for the gas to flow on the inner side. For this reason, the gas flow rate is conspicuously lowered especially at the flow passage grooves 5f, 5e disposed on the inner side. As a result, it is difficult to remove the produced water from the flow passage grooves 5f, 5e. A problem is pointed out in that if the produced water is accumulated in the porous layer, then the diffusion performance is lowered for the fuel gas and the oxygen-containing gas to diffuse to the catalyst electrode layer, and the power generation performance is conspicuously deteriorated.

SUMMARY OF THE INVENTION

A principal object of the present invention is to provide a fuel cell stack which makes it possible to effectively improve the gas flow performance in the surface of a separator and which makes it possible to ensure satisfactory drainage performance with a simple arrangement.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
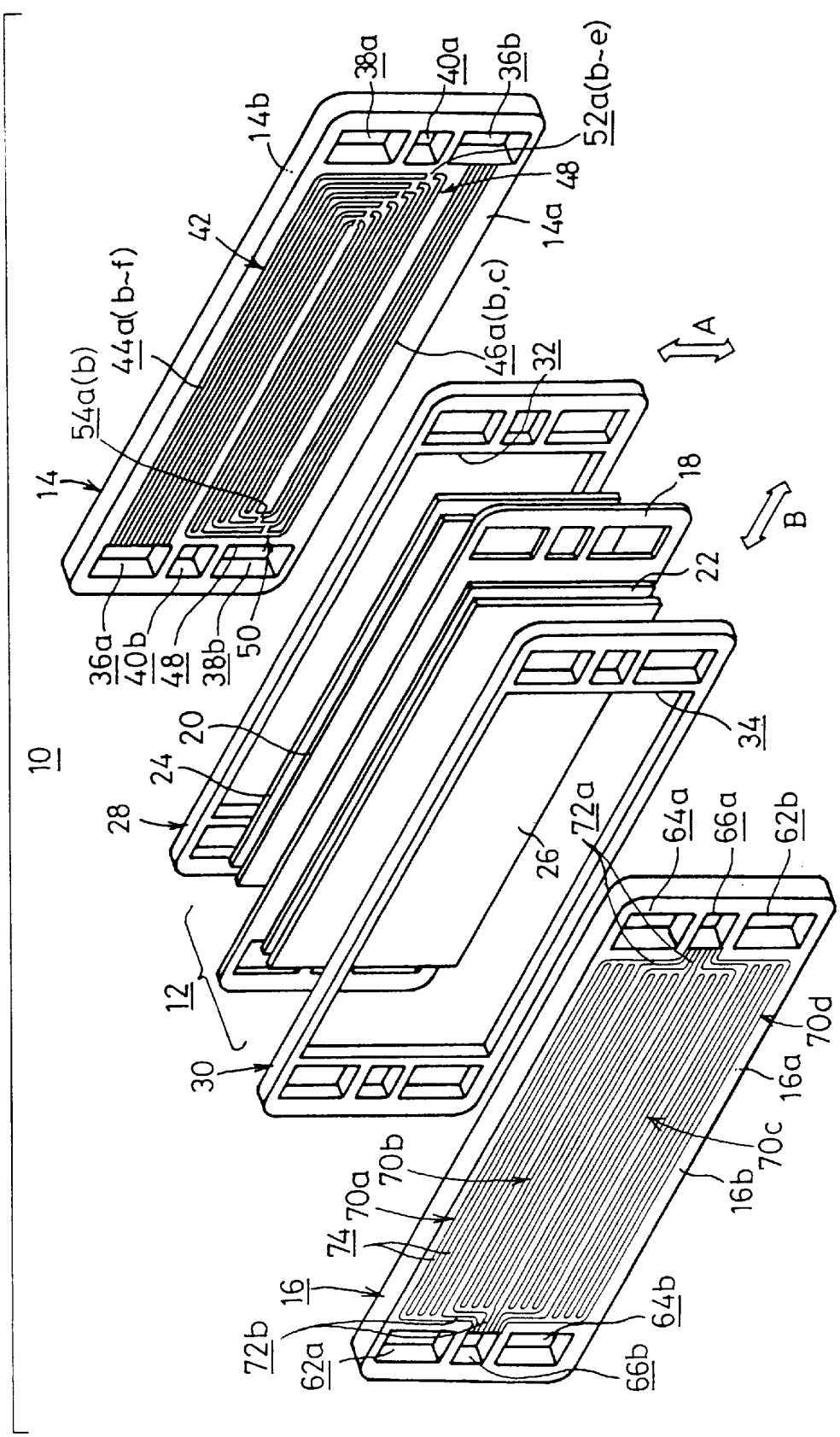
FIG. 1 shows an exploded perspective view illustrating major components of a fuel cell stack according to a first embodiment of the present invention.
Figure 2:
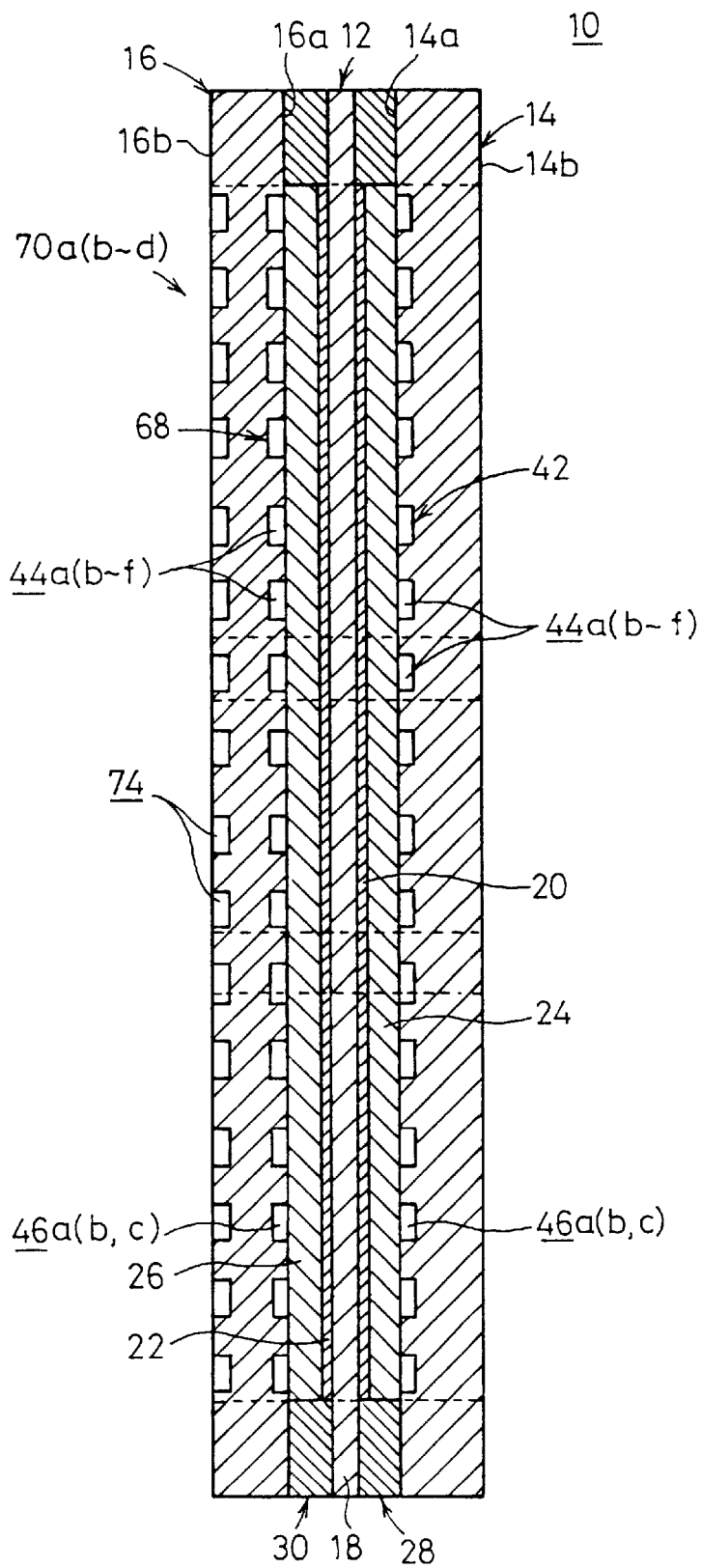
FIG. 2 shows a schematic vertical sectional view illustrating the fuel cell stack.

FIG. 1 shows an exploded perspective view illustrating major components of a fuel cell stack 10 according to a first embodiment of the present invention, and FIG. 2 shows a schematic vertical sectional view illustrating the fuel cell stack 10.

The fuel cell stack 10 comprises a fuel cell unit 12, and first and second separators 14, 16 for supporting the it fuel cell unit 12 interposed therebetween. A plurality of sets of these components are optionally stacked with each other. The fuel cell stack 10 has a rectangular parallelepiped-shaped configuration as a whole. For example, the fuel cell stack 10 is arranged such that the short side direction (direction of the arrow A) is directed in the direction of the gravity, and the long side direction (direction of the arrow B) is directed in the horizontal direction.

The fuel cell unit 12 includes a solid polymer ion exchange membrane 18, and a cathode electrode 20 and an anode electrode 22 which are arranged with the ion exchange membrane 18 intervening therebetween. First and second gas diffusion layers 24, 26, each of which is composed of, for example, porous carbon paper as a porous layer, are arranged for the cathode electrode 20 and the anode electrode 22.

First and second gaskets 28, 30 are provided on both sides of the fuel cell unit 12. The first gasket 28 has a large opening 32 for accommodating the cathode electrode 20 and the first gas diffusion layer 24. The second gasket 30 has a large opening 34 for accommodating the anode electrode 22 and the second gas diffusion layer 26. The fuel cell unit 12 and the first and second gaskets 28, 30 are interposed between the first and second separators 14, 16.

Figure 3:
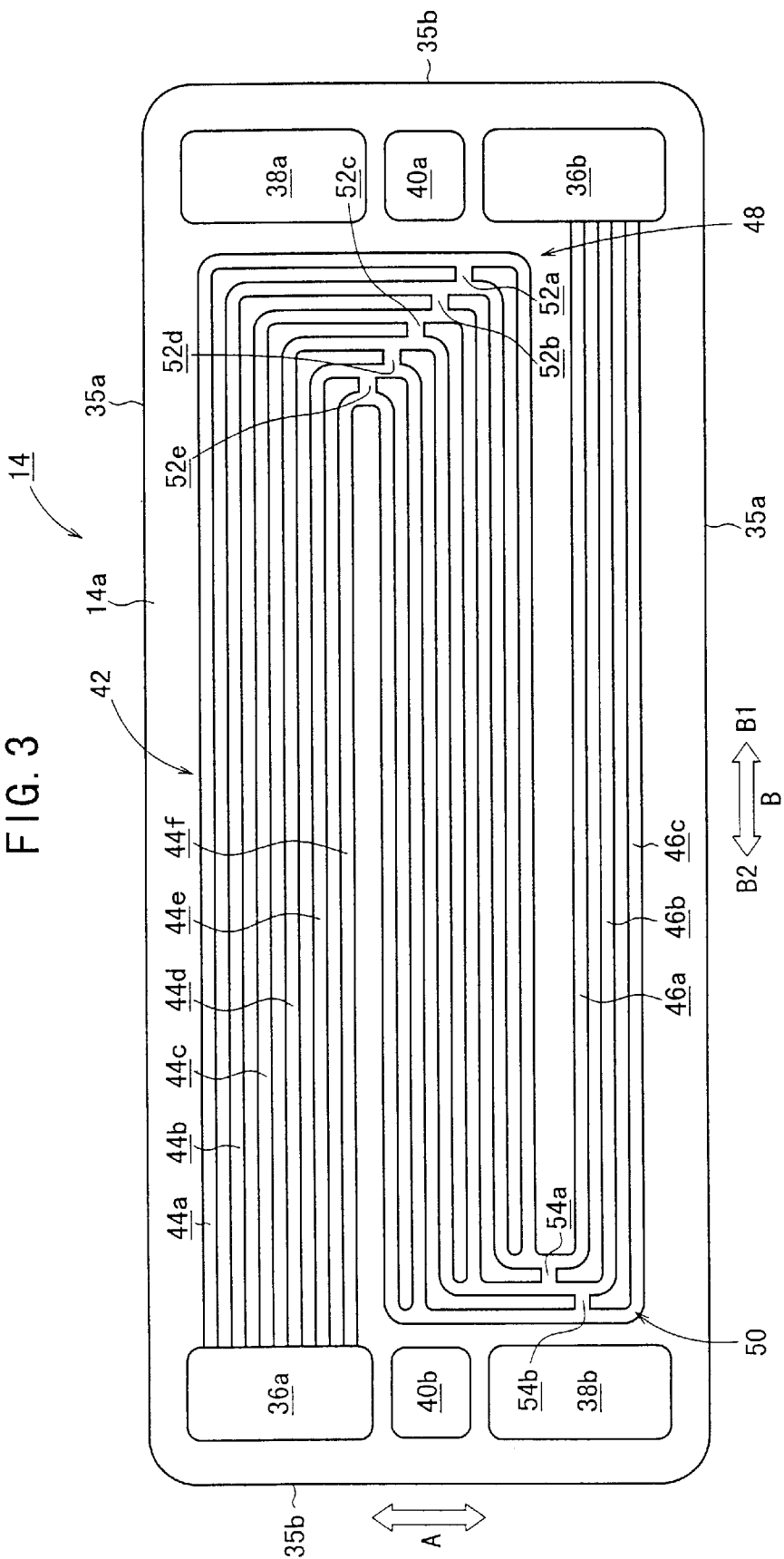
FIG. 3 shows a front view illustrating a first surface of a first separator for constructing the fuel cell stack.

As shown in FIGS. 1 and 3, the first separator 14 is designed such that each of the surface 14*a* opposed to the cathode electrode 20 and the surface 14*b* disposed on the opposite side has a rectangular configuration. For example, the first separator 14 is arranged such that the long side 35*a* is directed in the horizontal direction, and the short side 35*b* is directed in the direction of the gravity.

An oxygen-containing gas inlet 36*a* for allowing an oxygen-containing gas such as a gas containing oxygen or air to pass therethrough, and a fuel gas inlet 38*a* for allowing a fuel gas such as a hydrogen-containing gas to pass therethrough, each of which has a lengthy shape in the vertical direction, are provided at upper portions of the both end edges of the short sides 35*b* of the first separator 14 respectively. A cooling medium inlet 40*a* and a cooling medium outlet 40*b* for allowing a cooling medium such as pure water, ethylene glycol, and oil to pass therethrough are provided at substantially central portions of the both end edges of the short sides 35*b* of the first separator 14 respectively. An oxygen-containing gas outlet 36*b* and a fuel gas outlet 38*b*, each of which has a lengthy shape in the vertical direction, are provided at diagonal positions with respect to the oxygen-containing gas inlet 36*a* and the fuel gas inlet 38*a* at lower portions of the both end edges of the shorts sides 35*b* of the first separator 14 respectively.

An oxygen-containing gas flow passage 42, which communicates with the oxygen-containing gas inlet 36*a* and the oxygen-containing gas outlet 36*b*, is formed on the surface 14*a* of the first separator 14. The oxygen-containing gas flow passage 42 includes a plurality of, for example, six of first flow passage grooves 44*a* to 44*f*. First ends of the first gas flow passage grooves 44*a* to 44*f* communicate with the oxygen-containing gas inlet 36*a*.

The first flow passage grooves 44*a* to 44*f* extend in the horizontal direction (direction of the arrow B) from the side of the oxygen-containing gas inlet 36*a* toward the side of the fuel gas inlet 38*a*, they are thereafter bent in the downward direction (direction of the arrow A), and they extend in the horizontal direction from the side of the cooling medium inlet 40*a* toward the side of the cooling medium outlet 40*b*. Two individuals of the first gas flow passage grooves 44*a* to 44*f* are merged into each of second gas flow passage grooves 46*a* to 46*c* in the vicinity of the cooling medium outlet 40*b*. The second gas flow passage grooves 46*a* to 46*c* extend in the horizontal direction, and they communicate with the oxygen-containing gas outlet 36*b*.

The oxygen-containing gas flow passage 42 has a first bent section 48 at which the six first gas flow passage grooves 44*a* to 44*f* are bent over with substantially identical spacing distances with each other, and a second bent section 50 at which the first gas flow passage grooves 44*a* to 44*f* are merged into the three second gas flow passage grooves 46*a* to 46*c* and then they are bent over with predetermined spacing distances with each other.

The first bent section 48 is provided with first communication passages 52*a* to 52*e* which allow the oxygen-containing gas to flow between the first gas flow passage grooves 44*a* to 44*f* disposed on the inlet side extending in the vertical direction. The first communication passages 52*a* to 52*e* are provided while being separated from each other by predetermined distances respectively from the downstream side to the upstream side in the flow direction of the oxygen-containing gas. The first communication passage 52*a* makes mutual communication between the first gas flow passage grooves 44*a*, 44*b* which are disposed on the outermost circumferential side. On the other hand, the first communication passage 52*e* makes mutual communication between the first gas flow passage grooves 44*f*, 44*e* which are disposed on the innermost circumferential side.

The second bent section 50 is provided with second communication passages 54*a*, 54*b* which allow the oxygen containing gas to flow between the second gas flow passage grooves 46*a* to 46*c* disposed on the inlet side extending in the vertical direction. The second communication passage 54*a*, which makes communication between the second gas flow passage grooves 46*a*, 46*b* disposed on the innermost circumferential side, is provided so that it is separated by a predetermined distance on the upstream side in the flow direction of the oxygen-containing gas, as compared with the second communication passage 54*b* which makes communication between the second gas flow passage grooves 46*c*, 46*b* disposed on the outermost circumferential side.

As shown in FIG. 1, the second separator 16 is formed to have a rectangular configuration. An oxygen-containing gas inlet 62*a* and a fuel gas inlet 64*a* are formed to penetrate through upper portions of the both end edges on the short sides of the second separator 16 respectively. A cooling medium inlet 66*a* and a cooling medium outlet 66*b* are formed to penetrate through substantially central portions of the both end edges thereof respectively. An oxygen-containing gas outlet 62*b* and a fuel gas outlet 64*b*, which are arranged at diagonal positions with respect to the oxygen-containing gas inlet 62*a* and the fuel gas inlet 64*a*, are formed to penetrate through lower portions of the both end edges on the short sides of the second separator 16 respectively.

As shown in FIG. 2, a fuel gas flow passage 68, which makes communication between the fuel gas inlet 64*a* and the fuel gas outlet 64*b*, is formed on the surface 16*a* of the second separator 16 opposed to the anode electrode 22. The fuel gas flow passage 68 is constructed in the same manner as the oxygen-containing gas flow passage 42. The same constitutive components are designated by the same reference numerals, detailed explanation of which will be omitted.

Figure 4:
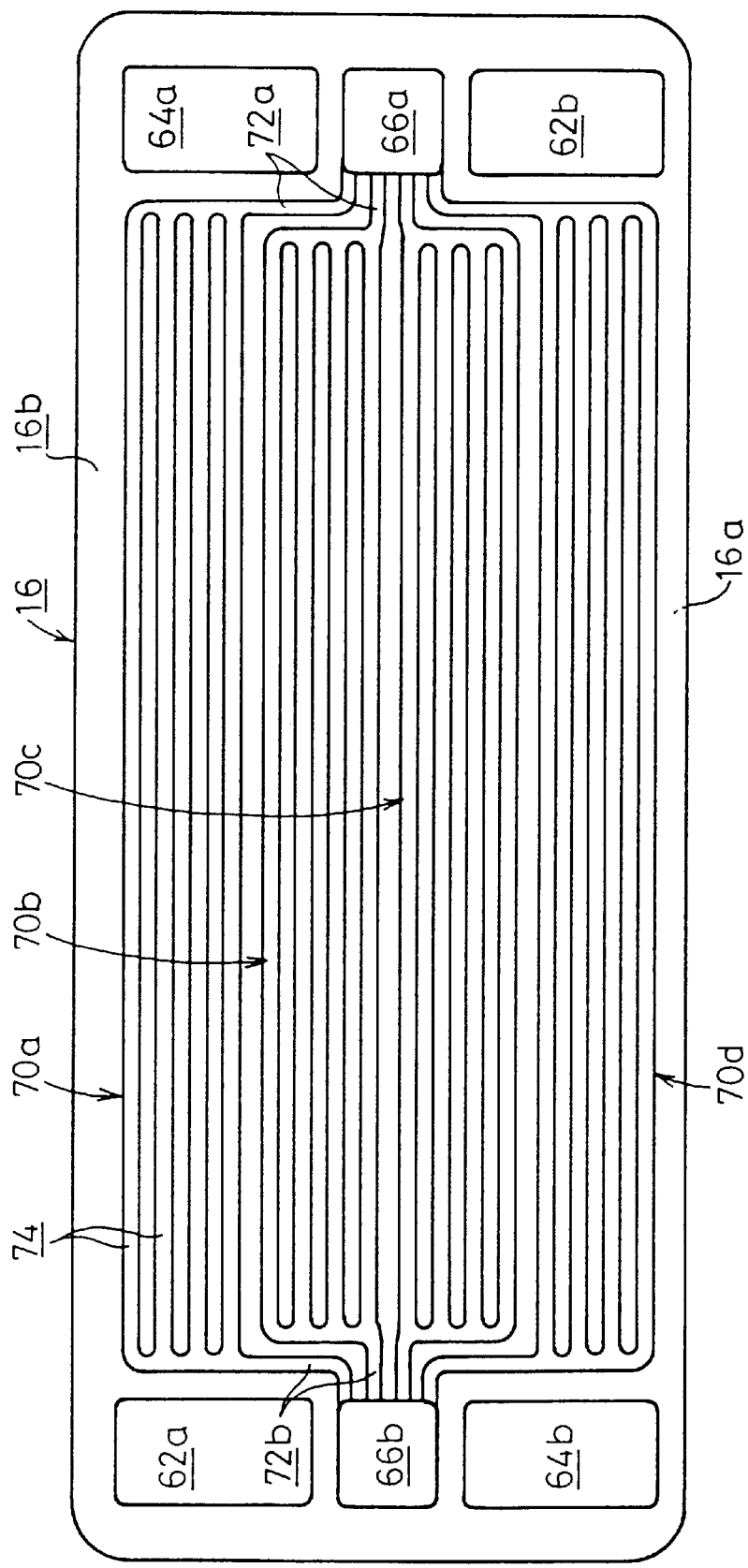
FIG. 4 shows a front view illustrating a second surface of the first separator.

As shown in FIGS. 1 and 4, cooling medium flow passages 70*a* to 70*d*, which make communication between the cooling medium inlet 66*a* and the cooling medium outlet 66*b*, are provided on the surface 16*b* opposite to the surface 16*a* of the second separator 16. Each of the cooling medium flow passages 70*a* to 70*d* includes single main flow passage grooves 72*a*, 72*b* to make communication with the cooling medium inlet 66*a* and the cooling medium outlet 66*b* respectively. A plurality of, for example, four of branched flow passage grooves 74, which are separated from each other by predetermined spacing distances, are provided in parallel to one another between the main flow passage grooves 72a, 72b to extend in the horizontal direction.

The operation of the fuel cell stack 10 according to the first embodiment constructed as described above will be explained below.

The fuel gas (for example, hydrogen-containing gas obtained by reforming hydrocarbon) is supplied to the inside of the fuel cell stack 10, and the air or the gas containing oxygen (hereinafter simply referred to as "air") as the oxygen-containing gas is supplied thereto. The air is introduced from the oxygen-containing gas inlet 36a of the first separator 14 into the oxygen-containing gas flow passage 42. As shown in FIG. 3, the air, which is supplied to the oxygen-containing gas flow passage 42, is firstly introduced into the first gas flow passage grooves 44a to 44f, and it is moved in the direction of the gravity while meandering in the long side direction (direction of the arrow B) of the surface 14a of the first separator 14.

During this process, the oxygen gas in the air passes through the first gas diffusion layer 24, and it is supplied to the cathode electrode 20 of the fuel cell unit 12. The air, which is not used, passes through the first gas flow passage grooves 44a to 44f, and it is merged into the second gas flow passage grooves 46a to 46c. The air is supplied to the cathode electrode 20 while being moved in the direction of the arrow B. On the other hand, the residual air is discharged from the oxygen-containing gas outlet 36b.

In this embodiment, the six first gas flow passage grooves 44a to 44f, which communicate with the oxygen-containing gas inlet 36a, extend in the first direction in the horizontal direction (direction of the arrow B1 in FIG. 3), and then they are bent at the first bent section 48 to extend in the second direction in the horizontal direction (direction of the arrow B2 in FIG. 3). In this arrangement, the first gas flow passage groove 44a, which is located at the outermost circumference of the first bent section 48, has two bent portions each of which has an angle of 90°, wherein a relatively long flow passage distance is provided between the respective bent portions. Accordingly, the oxygen-containing gas, which flows through the first gas flow passage groove 44a, can pass through the first bent section 48 relatively smoothly.

On the other hand, the first gas flow passage groove 44f, which is located at the innermost circumference of the first bent section 48, is bent over once practically at an angle of 180°. Therefore, the pressure loss of the flow passage is considerably large in the first gas flow passage groove 44f as compared with the first gas flow passage groove 44a.

Figure 5:
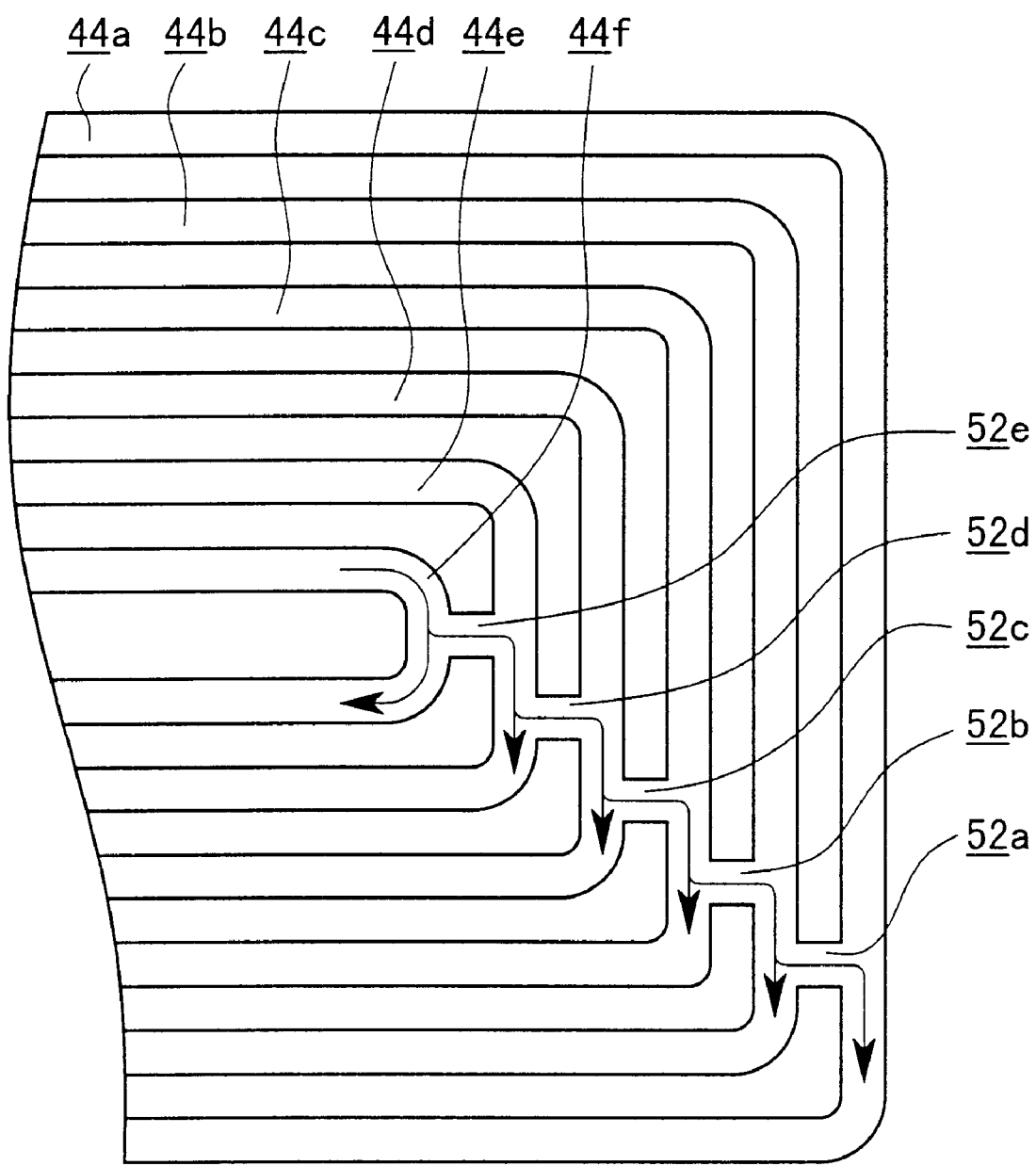
FIG. 5 illustrates, in a magnified manner, a bent section provided for the first separator.

Accordingly, in the first embodiment, the first communication passages 52a to 52e, which make communication between the mutually adjoining first gas flow passage grooves 44a to 44f, are provided on the inlet side of the first bent section 48. Therefore, as shown in FIG. 5, a part of the air, which is supplied to the first gas flow passage groove 44f to be bent over at an angle of 90° at the first bent section 48, can flow to the first gas flow passage groove 44e via the first communication passage 52e.

Similarly, a part of the air, which passes through the first gas flow passage groove 44e to be bent over at an angle of 900 at the first bent section 48, passes through the first communication passage 52d, and it is introduced into the first gas flow passage groove 44d. A part of the air flowing through the first gas flow passage groove 44d is introduced into the first gas flow passage groove 44c via the first communication passage 52c on the inlet side of the first bent section 48. A part of the air flowing through the first gas flow passage groove 44c is introduced into the first gas flow passage groove 44b via the first communication passage 52b. A part of the air flowing through the first gas flow passage groove 44b is introduced into the first gas flow passage groove 44a via the first communication passage 52a.

Accordingly, the pressure loss does not differ between the inner side (first gas flow passage groove 44f) and the outer side (first gas flow passage groove 44a) of the first bent section 48. It is possible to obtain uniform pressure loss for the first gas flow passage grooves 44a to 44f. An effect is obtained such that a uniform flow rate is obtained as a whole, and the produced water can be discharged reliably and smoothly. Further, the uniform flow of the air is obtained over the surface 14a of the first separator 14. Accordingly, the reaction is uniformly performed in the power generation surface. An advantage is obtained such that the power generation performance can be maintained in a satisfactory manner.

At the second bent section 50, a part of the air flowing through the inner second gas flow passage groove 46a is introduced from the second communication passage 54a to the second gas flow passage groove 46b on the inlet side of the second bent section 50 in the same manner as described above. Further, a part of the air flowing through the second gas flow passage groove 46b passes through the second communication passage 54b on the inlet side of the second bent section 50, and it is introduced into the outer second gas flow passage groove 46c. Therefore, the air flows uniformly while maintaining a desired flow rate in the second gas flow passage grooves 46a to 46c. Accordingly, the removal of produced water is performed reliably.

At the second bent section 50, the six first gas flow passage grooves 44a to 44f are merged into the three second gas flow passage grooves 46a to 46c, and then they are bent over. On this condition, especially at the second bent section 50, the pressure loss of the flow passage tends to be considerably large, and the flow of the air tends to be non-uniform. The pressure loss of the second gas flow passage grooves 46a to 46c can be reliably made uniform, and the air can be allowed to flow smoothly and uniformly by providing the second communication passages 54a, 54b to make it possible to allow the oxygen-containing gas to flow between the second gas flow passage grooves 46a to 46c on the inlet side extending in the vertical direction.

The six first gas flow passage grooves 44a to 44f on the side of the oxygen-containing gas inlet 36a are merged into the three second gas flow passage grooves 46a to 46c on the side of the oxygen-containing gas outlet 36b, and thus the number of the grooves is reduced to the half. Accordingly, it is possible to increase the flow rate of the air in the vicinity of the oxygen-containing gas outlet 36b, and it is possible to more effectively remove the produced water from the oxygen-containing gas outlet 36b. Therefore, it is possible to avoid the increase in concentration overpotential which would be otherwise caused due to the shortage of gas supply in the surface 14a of the first separator 14. Thus, an advantage is obtained such that the fuel cell stack 10 can be operated stably.

In the second separator 16, the fuel gas, which is supplied from the fuel gas inlet 64a to the fuel gas flow passage 68, is moved in the direction of the gravity while meandering in the horizontal direction along the surface 16a. During this process, in the same manner as the air supplied to the oxygen-containing gas flow passage 42, the hydrogen gas in the fuel gas is supplied from the second gas diffusion layer 26 to the anode electrode 22, while the fuel gas, which is not used, is discharged from the fuel gas outlet 64b.

During this process, the fuel gas flow passage 68 tends to suffer from the existence of the water produced by condensation of water added to the fuel gas for the purpose of humidification, and the water resulting from the produced water on the side of the cathode electrode 20 transmitted through the ion exchange membrane 18. However, the fuel gas flow passage 68, which is formed on the surface 16a of the second separator 16, is constructed in the same manner as the oxygen-containing gas flow passage 42. The flow rate of the fuel gas can be made uniform over the entire fuel gas flow passage 68. Thus, an effect is obtained such that the removal of water is reliably performed.

The cooling medium is supplied to the fuel cell stack 10. The cooling medium is supplied to the cooling medium inlets 40a, 66a of the first and second separators 14, 16. As shown in FIG. 4, the cooling medium, which is supplied to the cooling medium inlet 66a of the second separator 16, is introduced into the respective main flow passage grooves 72a which constitute the cooling medium flow passages 70a to 70d. The cooling medium flows along the main flow passage grooves 72a in the upward direction, in the horizontal direction, and in the downward direction. The cooling medium is introduced into the plurality of branched flow passage grooves 74 branched from the respective main flow passage grooves 72a. The cooling medium flows in the horizontal direction over the substantially entire surface of the surface 16b along the branched flow passage grooves 74. After that, the cooling medium passes through the main flow passage grooves 72b into which the branched flow passage grooves 74 are merged, and it is discharged from the cooling medium outlet 66b.

Figure 6:
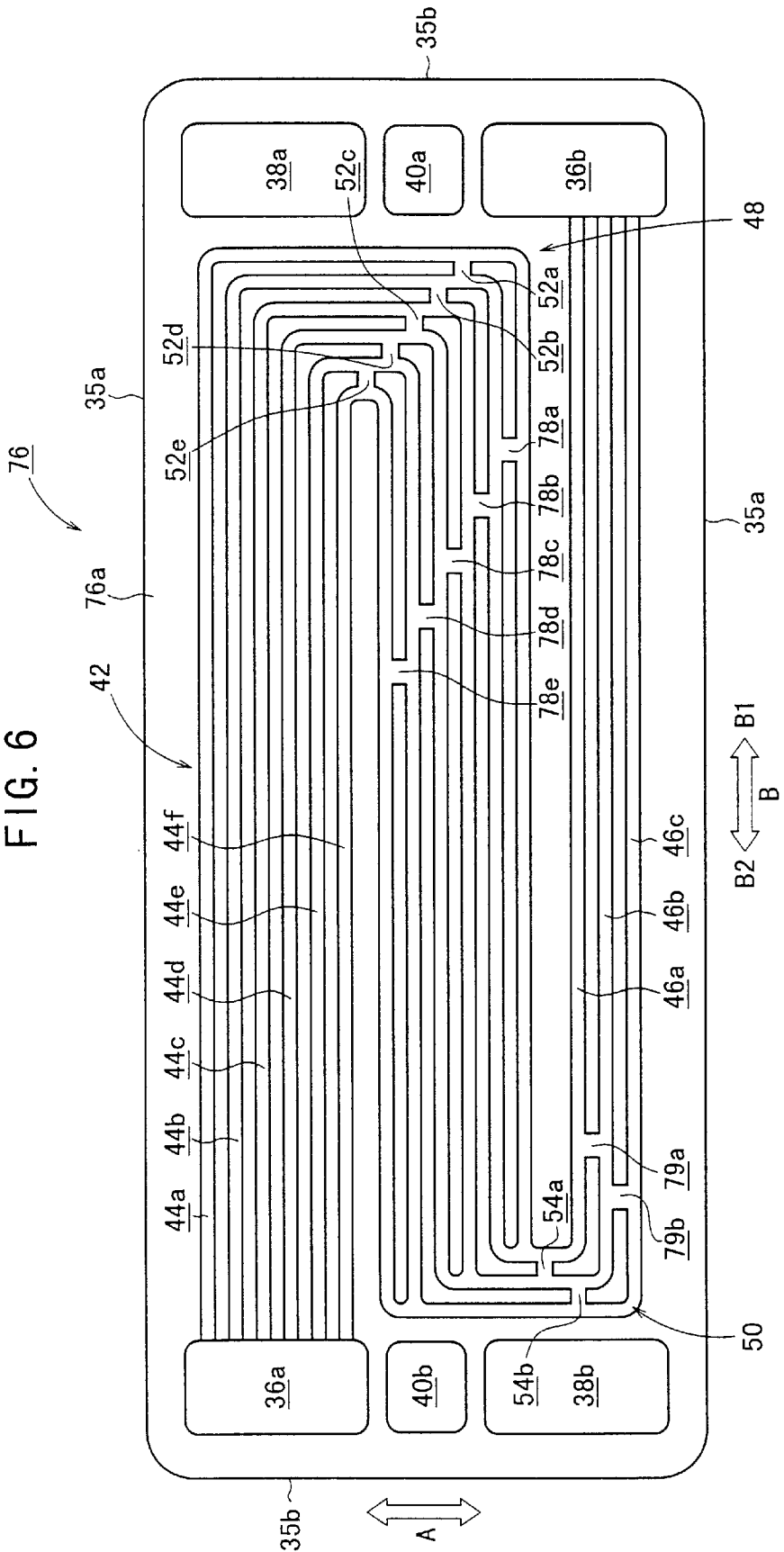
FIG. 6 shows a partial front view illustrating a surface of a first separator for constructing a fuel cell stack according to a second embodiment of the present invention.

FIG. 6 shows a partial front view illustrating a surface 76a of a first separator 76 for constructing a fuel cell stack according to a second embodiment of the present invention. The same constitutive components as those of the first separator 14 for constructing the fuel cell stack 10 according to the first embodiment are designated by the same reference numerals, detailed explanation of which will be omitted.

An oxygen-containing gas flow passage 42 is provided on the surface 76a of the first separator 76. In addition to first communication passages 52a to 52e for making communication between first gas flow passage grooves 44a to 44f on the inlet side extending in the vertical direction, first communication passages 78a to 78e for enabling the oxygen-containing gas to flow between the first gas flow passage grooves 44a to 44f on the outlet side extending in the horizontal direction on the downstream side are provided at a first bent section 48 of the oxygen-containing gas flow passage 42. The first communication passages 78a to 78e are provided so that they are separated from each other by predetermined spacing distances from the upstream side to the downstream side in the flow direction of the oxygen-containing gas respectively.

In addition to second communication passages 54a, 54b for making communication between second gas flow passage grooves 46a to 46c on the inlet side extending in the vertical direction, second communication passages 79a, 79b for enabling the oxygen-containing gas to flow between the second gas flow passage grooves 46a to 46c on the outlet side extending in the horizontal direction on the downstream side are provided at a second bent section 50 of the oxygen-containing gas flow passage 42. The second communication passage 79a, which makes communication between the second gas flow passage grooves 46a, 46b disposed on the innermost side, is provided so that it is separated by a predetermined distance on the downstream side in the flow direction of the oxygen-containing gas, as compared with the second communication passage 79b which makes communication between the second gas flow passage grooves 46c, 46b disposed on the outermost side.

Figure 7:
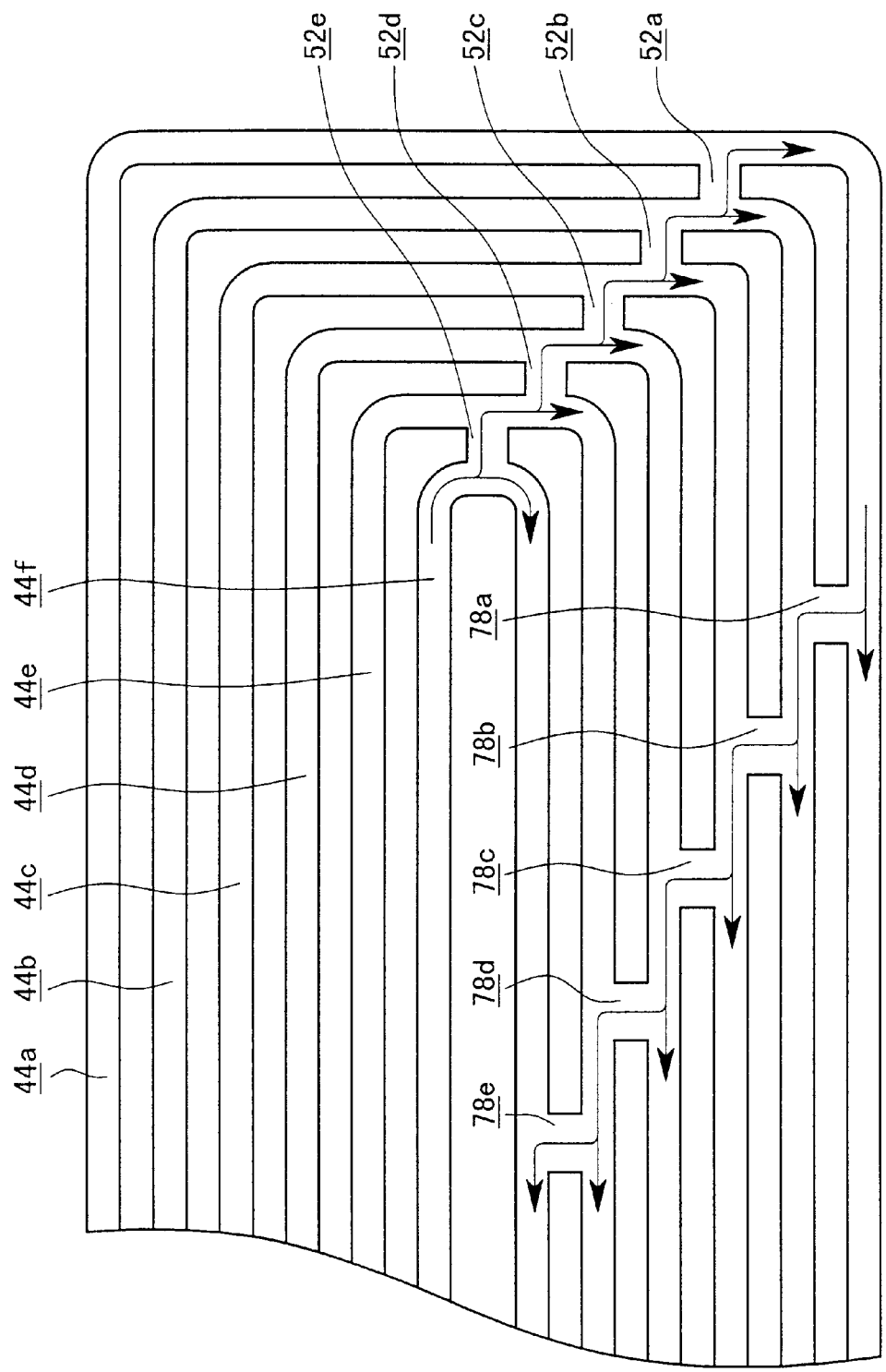
FIG. 7 illustrates, in a magnified manner, a bent section provided.for the first separator.

In the second embodiment constructed as described above, when the air, which flows in the horizontal direction (direction of the arrow B1) along the first gas flow passage grooves 44a to 44f, is bent over at the first bent section 48, the pressure loss of the first gas flow passage grooves 44a to 44f can be made uniform by the aid of the first communication passages 52a to 52e disposed on the inlet side of the first bent section 48 as shown in FIG. 7.

Further, the air, which flows along the first gas flow passage grooves 44a to 44f, is introduced into the first communication passages 78a to 78e provided on the outlet side of the first bent section 48. Thus, the pressure loss of the first gas flow passage grooves 44a to 44f is made uniform. Accordingly, it is possible to obtain a uniform flow rate of the air for the first gas flow passage grooves 44a to 44f as a whole. An effect is obtained such that the produced water can be removed more reliably with ease.

The second communication passages 54a, 54b on the inlet side and the second communication passages 79a, 79b on the outlet side are provided at the second bent section 50 at which the six first gas flow passage grooves 44a to 44f are bent over after being merged into the three second gas flow passage grooves 46a to 46c. Accordingly, the pressure loss of the second gas flow passage grooves 46a to 46c is made uniform on the inlet side and on the outlet side of the second bent section 50. It is possible to obtain a uniform flow rate of the air for the second gas flow passage grooves 46a to 46c more reliably as a whole.

Figure 8:
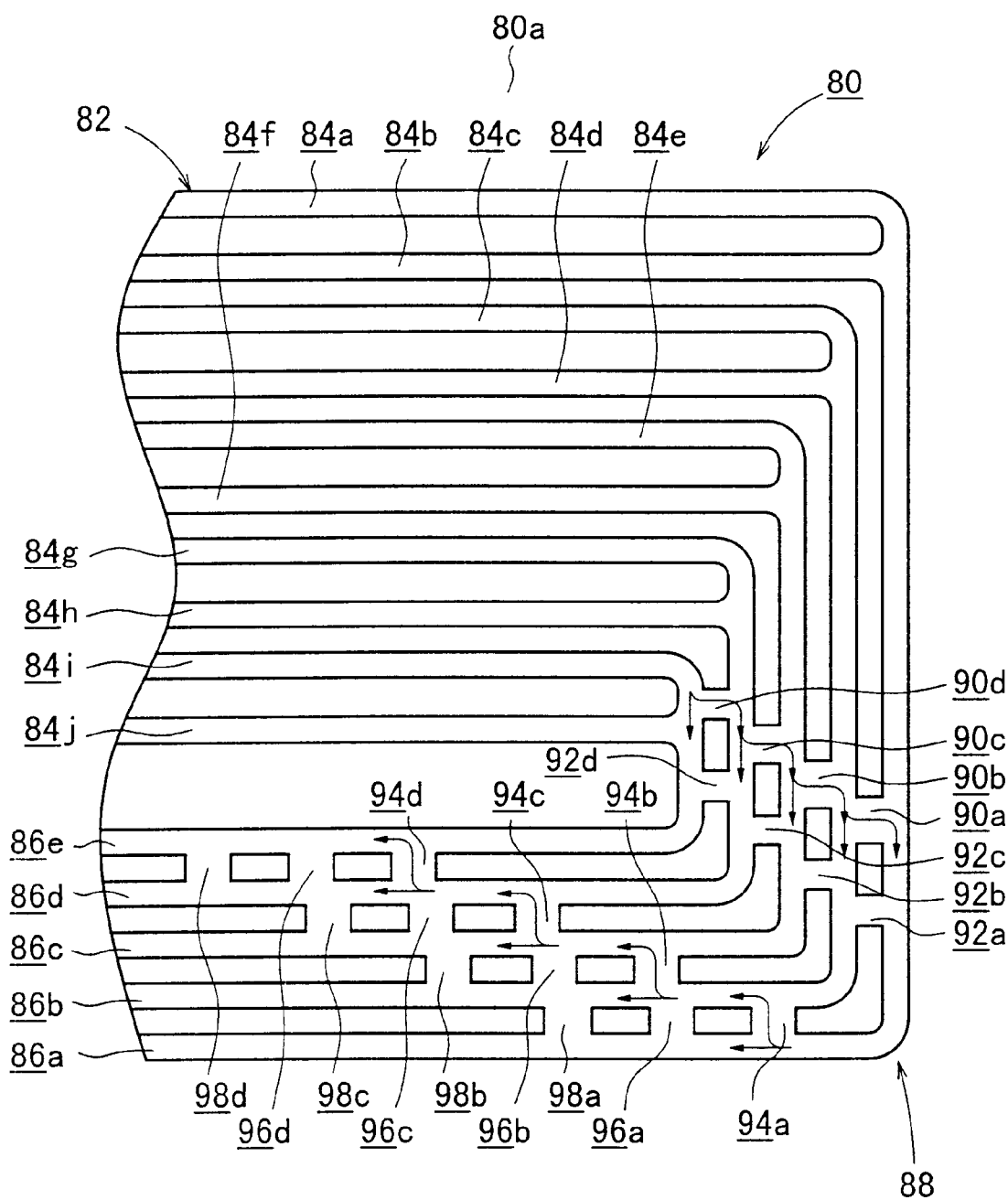
FIG. 8 shows a partial front view illustrating a surface of a first separator for constructing a fuel cell stack according to a third embodiment of the present invention.

FIG. 8 shows a partial front view illustrating a surface 80a of a first separator 80 for constructing a fuel cell stack according to a third embodiment of the present invention. An oxygen-containing gas flow passage 82 is formed on the surface 80a of the first separator 80. The oxygen-containing gas flow passage 82 is provided with a plurality of, for example, ten of first gas flow passage grooves 84a to 84j. The first gas flow passage grooves 84a to 84j extend in the horizontal direction, and two individuals of them are merged into each of second gas flow passage grooves 86a to 86e. After that, the second gas flow passage grooves 86a to 86e are bent over at a bent section 88, and they extend in the horizontal direction.

First communication passages 90a to 90d, 92a to 92d for enabling the air to flow between the second gas flow passage grooves 86a to 86e on the inlet side extending in the vertical direction, and second communication passages 94a to 94d, 96a to 96d, 98a to 98d for enabling the air to flow between the second gas flow passage grooves 86a to 86e on the outlet side extending in the horizontal direction are provided at the bent section 88.

The first communication passages 90a to 90d, which are disposed on the inlet side, are provided so that they are separated from each other by predetermined spacing distances respectively from the downstream side to the upstream side in the flow direction of the air. Similarly, the first communication passages 92a to 92d are provided so that they are separated from each other by predetermined spacing distances respectively from the downstream side to the upstream side in the flow direction of the air. The second communication passages 94a to 94d, 96a to 96d, 98a to 98d, which are disposed on the outlet side, are provided so that they are separated from each other by predetermined spacing distances respectively from the upstream side to the downstream side in the flow direction of the air.

In the third embodiment constructed as described above, the air, which flows in the horizontal direction along the first gas flow passage grooves 84a to 84j, is merged into the second gas flow passage grooves 86a to 86e, followed by being bent over at the bent section 88. In that event, the second gas flow passage groove 86e, which is disposed on the inner side of the bent section 88, is bent over substantially at an angle of 180°. Therefore, it may be difficult to allow the air to flow therethrough.

In the third embodiment, the second gas flow passage groove 86d communicates with the vertical portion of the second gas flow passage groove 86e via the first communication passages 90d, 92d. A part of the air, which flows through the vertical portion of the second gas flow passage groove 86e, passes through the first communication passages 90d, 92d, and it is introduced into the vertical portion of the second gas flow passage groove 86d.

Therefore, the flow passage pressure loss can be made uniform especially for the second gas flow passage groove 86e disposed on the inner side of the bent section 88 and for the second gas flow passage groove 86a disposed on the outer side of the bent section 88. Accordingly, the pressure loss of the second gas flow passage grooves 86a to 86e can be made uniform, and it is possible to obtain a uniform flow rate as a whole. An effect is obtained such that the produced water can be removed reliably.

Further, in order to enable the air to flow between the second gas flow passage grooves 86a to 86e disposed on the inlet side, the first communication passages 90a to 90d and the first communication passages 92a to 92d are provided at the two stages. Accordingly, the pressure loss of the second gas flow passage grooves 86a to 86e can be made uniform more reliably at the bent section 88. An advantage is obtained such that the produced water is removed smoothly, and the reaction is performed uniformly in the surface 80a of the first separator 80.

The second communication passages 94a to 94d, 96a to 96d, 98a to 98d, which make mutual communication between the second gas flow passage grooves 86a to 86e, are formed at the bent section 88. Accordingly, the air, which is moved to the outer side via the first communication passages 90a to 90d, 92a to 92d, can be returned to the inner side of the bent section 88. Thus, the pressure loss can be made uniform for the entire second gas flow passage grooves 86a to 86e.

Accordingly, the following advantage is obtained. That is, the air, which is introduced from the first gas flow passage grooves 84a to 84j into the second gas flow passage grooves 86a to 86e, does not cause any partial decrease in gas flow rate after being bent over at the bent section 88. The flow rate can be made uniform as a whole, and the produced water in the surface 80a of the first separator 80 can be discharged reliably.

Figure 9:
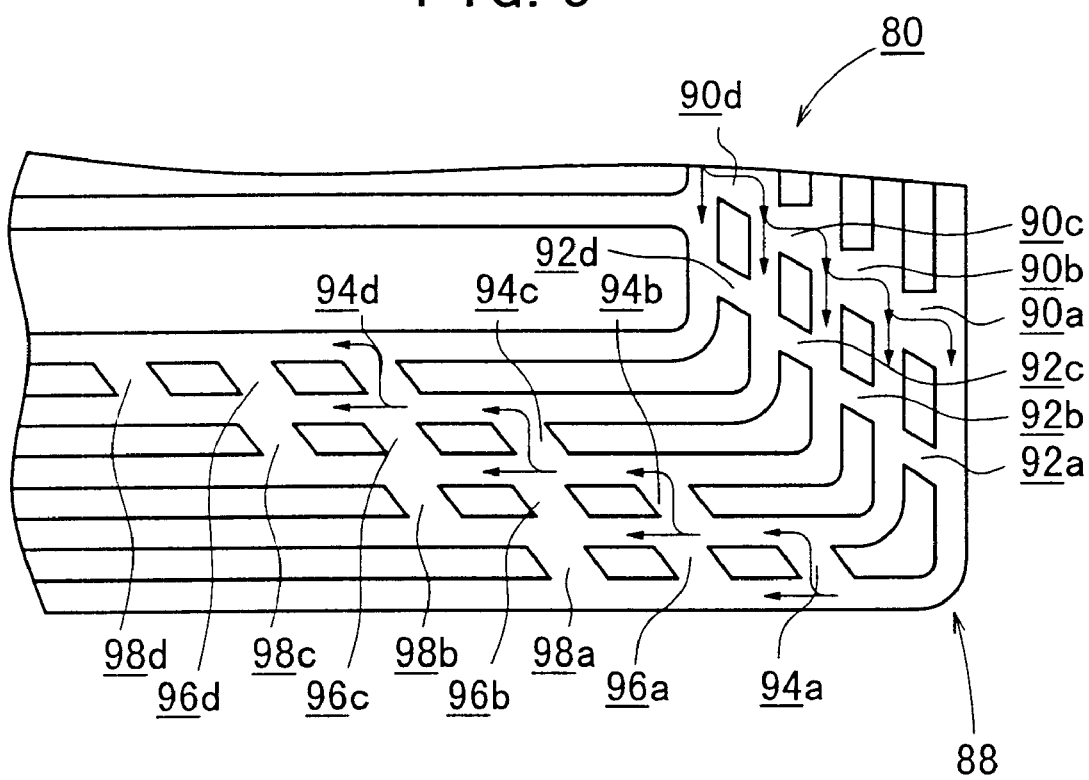
FIG. 9 illustrates, in a magnified manner, another shape of a bent section provided for the first separator.
Figure 10:
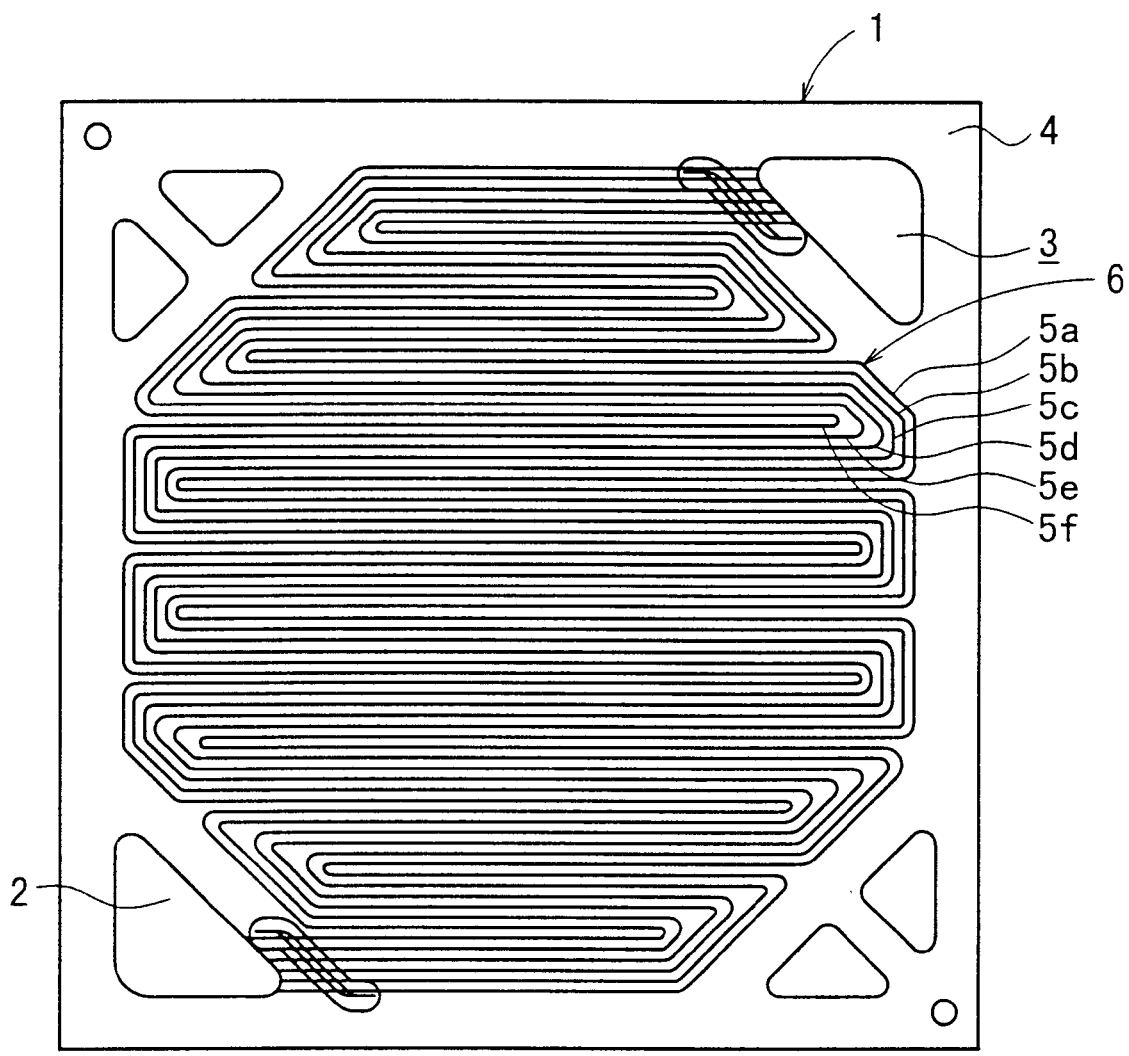
FIG. 10 shows a front view illustrating a separator concerning the conventional technique.

As shown in FIG. 9, the first communication passages 90a to 90d, 92a to 92d and the second communication passages 94a to 94d, 96a to 96d, 98a to 98d may be constructed in an inclined manner in the flow direction of the oxygen-containing gas. Accordingly, an effect is obtained such that the flow of the oxygen-containing gas is effected more smoothly.

In the fuel cell stack according to the present invention, when the plurality of flow passage grooves for allowing the fluid including the fuel gas and the oxygen-containing gas to flow therethrough are bent over in the surface of the separator, the fluid can flow between the respective flow passage grooves via the communication passages. The partial decrease in gas flow rate can be effectively avoided for the flow passage grooves, and the produced water can be reliably removed. Accordingly, no ununiformity of the power generation efficiency is caused in the power generation surface, and it is possible to maintain the desired power generation performance with the simple arrangement.

What is claimed is:

1. A fuel cell stack comprising:
  a plurality of fuel cell units each composed of an electrolyte interposed between an anode electrode and a cathode electrode, said plurality of fuel cell units being stacked with separators intervening therebetween,
  a plurality of flow passage grooves provided in a surface of said separator, for allowing a fluid including at least any one of a fuel gas to be supplied to said anode electrode and an oxygen-containing gas to be supplied to said cathode electrode to flow therethrough,
  wherein said flow passage grooves have a bent section in said surface of said separator, and communication passages are provided at said bent section are discrete and extend non-linearly, which allow said fluid to flow between mutual adjoining flow passage grooves, and
  wherein said flow passage grooves are disposed independently from each other at said bent section, thereby enabling gas flow into and past said communication passages.

2. The fuel cell stack according to claim 1, wherein said flow passage grooves are designed such that a number of grooves on a gas outlet side is reduced to be smaller than a number of grooves on a gas inlet side.

3. The fuel cell stack according to claim 1, wherein said communication passages are provided such that they are separated from each other by spacing distances from a downstream side to an upstream side in a flow direction of said fluid from an outer circumferential side toward an inner circumferential side of said bent section.

4. The fuel cell stack according to claim 1, wherein said communication passages include communication passages which are disposed on an inlet side of said bent section, and communication passages which are provided on an outlet side of said bent section.

5. The fuel cell stack according to claim 4, wherein:
  a said communication passages, which are provided on said inlet side, are disposed such that they are separated from each other by spacing distances from a downstream side to an upstream side in a flow direction of said fluid from an outer circumferential side toward an inner circumferential side of said bent section; and
  said communication passages, which are provided on said outlet side, are disposed such that they are separated from each other by spaced distances from said upstream side to said downstream side in said flow direction of said fluid from said outer circumferential side toward said inner circumferential side of said bend section.

6. The fuel cell stack according to claim 5, wherein at least two arrays of said communication passages are provided on said inlet side and on said outlet side of said bent section respectively.

7. A fuel cell stack comprising:
  a plurality of fuel cell units each composed of an electrolyte interposed between an anode electrode and a cathode electrode, said plurality of fuel cell units being stacked with separators intervening therebetween,
  a plurality of flow passage grooves provided in a surface of said separator, for allowing a fluid including at least any one of a fuel gas to be supplied to said anode electrode and an oxygen-containing gas to be supplied to said cathode electrode to flow therethrough, wherein said flow passage grooves have a bent section in said surface of said separator, and communication passages are provided at said bent section, which allow said fluid to flow between mutual adjoining flow passage grooves, and wherein said flow passage grooves are designed such that a number of grooves on a gas outlet side is reduced to be smaller than a number of grooves on a gas inlet side.

8. The fuel cell stack according to claim 7, wherein said communication passages are provided such that they are separated from each other by spacing distances from a downstream side to an upstream side in a flow direction of said fluid from an outer circumferential side toward an inner circumferential side of said bent section.

9. The fuel cell stack according to claim 7, wherein said communication passages include communication passages which are disposed on an inlet side of said bent section, and communication passages which are provided on an outlet side of said bent section.

10. The fuel cell stack according to claim 9, wherein:

said communication passages, which are provided on said inlet side, are disposed such that they are separated from each other by spacing distances from a downstream side to an upstream side in a flow direction of said fluid from an outer circumferential side toward an inner circumferential side of said bent section; and said communication passages, which are provided on said outlet side, are disposed such that they are separated from each other by spaced distances from said upstream side to said downstream side in said flow direction of said fluid from said outer circumferential side toward said inner circumferential side of said bend section.

11. The fuel cell stack according to claim 10 wherein at least two arrays of said communication passages are provided on said inlet side and on said outlet side of said bent section respectively.

* * * * *